US011078631B2

(12) United States Patent
Gilbert

(10) Patent No.: US 11,078,631 B2
(45) Date of Patent: Aug. 3, 2021

(54) SYSTEM AND METHOD FOR INSPECTING A RAIL USING MACHINE LEARNING

(71) Applicant: Sperry Rail Holdings, Inc., Danbury, CT (US)

(72) Inventor: David Henry Gilbert, Wirksworth (GB)

(73) Assignee: SPERRY RAIL HOLDINGS, INC., Danbury, CT (US)

( * ) Notice: Subject to any disclaimer, the term of this patent is extended or adjusted under 35 U.S.C. 154(b) by 211 days.

(21) Appl. No.: 15/826,780

(22) Filed: Nov. 30, 2017

(65) Prior Publication Data

US 2019/0161919 A1    May 30, 2019

(51) Int. Cl.
*E01B 35/06* (2006.01)
*G06N 3/08* (2006.01)
(Continued)

(52) U.S. Cl.
CPC ........... *E01B 35/06* (2013.01); *G01N 27/025* (2013.01); *G01N 27/9046* (2013.01);
(Continued)

(58) Field of Classification Search
None
See application file for complete search history.

(56) References Cited

U.S. PATENT DOCUMENTS 5,777,891 A * 7/1998 Pagano .............. G01N 29/0609
702/39
6,523,411 B1 * 2/2003 Mian .................... G01N 29/225
73/602

(Continued)

FOREIGN PATENT DOCUMENTS

CN        107290428 A    10/2017

OTHER PUBLICATIONS

Zeng-Guang Hou ; M.M. Gupta,A rail damage detection and measurement system using neural networksCIMSA 2004—EEE Intemationvl Conference on Computatianvl Intelligence for Measurement Systems and Appljcations Boston, MA, USA. 1 (Year: 2004).*

(Continued)

*Primary Examiner* — Matthew G Marini
(74) *Attorney, Agent, or Firm* — Cantor Colburn LLP

(57) ABSTRACT

An aspect includes a vehicle that includes rail inspection sensors configured for capturing transducer data describing the rail, and a processor configured for receiving and processing the transducer data in near-real time to determine whether the captured transducer data identifies a suspected rail flaw. The processing includes inputting the captured transducer data to a machine learning system that has been trained to identify patterns in transducer data that indicate rail flaws. The processing also includes receiving an output from the machine learning system, the output indicating whether the captured transducer data identifies a suspected rail flaw. An alert is transmitted to an operator of the vehicle based at least in part on the output indicating that the captured transducer data identifies a suspected rail flaw. The alert includes a location of the suspected rail flaw and instructs the operator to stop the vehicle and to perform a repair action.

20 Claims, 16 Drawing Sheets

(51) Int. Cl.

| | | |
|---|---|---|
| *G06N 3/04* | (2006.01) | |
| *G01N 27/02* | (2006.01) | |
| *G01N 29/44* | (2006.01) | |
| *G01N 27/90* | (2021.01) | |
| *G01N 29/04* | (2006.01) | |
| *G01N 29/22* | (2006.01) | |
| *G01N 29/265* | (2006.01) | |
| *G01N 27/9093* | (2021.01) | |

(52) U.S. Cl.
CPC ......... *G01N 29/043* (2013.01); *G01N 29/225* (2013.01); *G01N 29/265* (2013.01); *G01N 29/4481* (2013.01); *G06N 3/04* (2013.01); *G06N 3/0445* (2013.01); *G06N 3/0454* (2013.01); *G06N 3/08* (2013.01); *G01N 27/9093* (2013.01); *G01N 2291/0289* (2013.01); *G01N 2291/2623* (2013.01)

(56) References Cited

U.S. PATENT DOCUMENTS

| | | | |
|---|---|---|---|
| 6,600,999 | B2 | 7/2003 | Clark et al. |
| 6,768,298 | B2 | 7/2004 | Katragadda et al. |
| 8,736,419 | B2 | 5/2014 | McQuade et al. |
| 9,689,760 | B2* | 6/2017 | Lanza di Scalea .......................... G01M 5/0025 |
| 2002/0099507 | A1* | 7/2002 | Clark ..................... B61D 15/00 702/36 |
| 2012/0062743 | A1 | 3/2012 | Lynam et al. |
| 2015/0373039 | A1* | 12/2015 | Wang .................. H04L 63/1425 726/23 |
| 2016/0035150 | A1 | 2/2016 | Barfield, Jr. et al. |
| 2017/0267264 | A1 | 2/2017 | English et al. |
| 2017/0106885 | A1* | 4/2017 | Singh .................... B61L 23/044 |
| 2017/0286805 | A1 | 10/2017 | Yu et al. |
| 2017/0313332 | A1* | 11/2017 | Paget .................. B61L 27/0077 |
| 2018/0173243 | A1* | 6/2018 | Park ...................... G05D 1/0088 |
| 2018/0268255 | A1* | 9/2018 | Surazhsky .............. G06N 3/08 |
| 2018/0308231 | A1* | 10/2018 | Kish ........................ G06K 9/66 |
| 2019/0019589 | A1* | 1/2019 | Waite ................... G21C 17/017 |

OTHER PUBLICATIONS

Cyprian F. Ngolah, Ed Mordenl and Yingxu Wang, An Intelligent Fault Recognizer for Rotating Machinery via Remote Characteristic Vibration Signal Detection, IEEE, 2011 (Year: 2011).*

Tim de Bruin, Kim Verbert, and Robert Babuska, Railway Track Circuit Fault Diagnosis Using Recurrent Neural Networks, vol. 28 , No. 3, Mar. 2017 (Year: 2017).*

Vi v i e n n e S z e, Senior Member I E E E, Yu-Hs i n C h e n , Student Member I E E E ,Tien-Ju Ya ng, Student Member IEEE, a nd Joel S. Emer, Fellow IEEE, Efficient Processing of Deep Neural Networks: A Tutorial and Survey, vol. 105, No. 12, Dec. 2017 | Proceedings of the IEEE (Year: 2017).*

Clair, et al. "Using Neural Networks to Automate the Detection of Rail Defects" American Society of Nondestructive Testing, Inc.'s 2000 Research Symposium, Mar. 2000, 11 pages.

Jamshid Ghaboussi, "Neural Network Based Rail Flaw Detection Using Unprocessed Ultrasonic Data", IDEA, Jun. 2003, 44 pages.

International Search Report and Written Opinion for Internation Application No. PCT/US18/62737; International Filing Date: Nov. 28, 2018, dated Feb. 4, 2019, 26 pages.

* cited by examiner

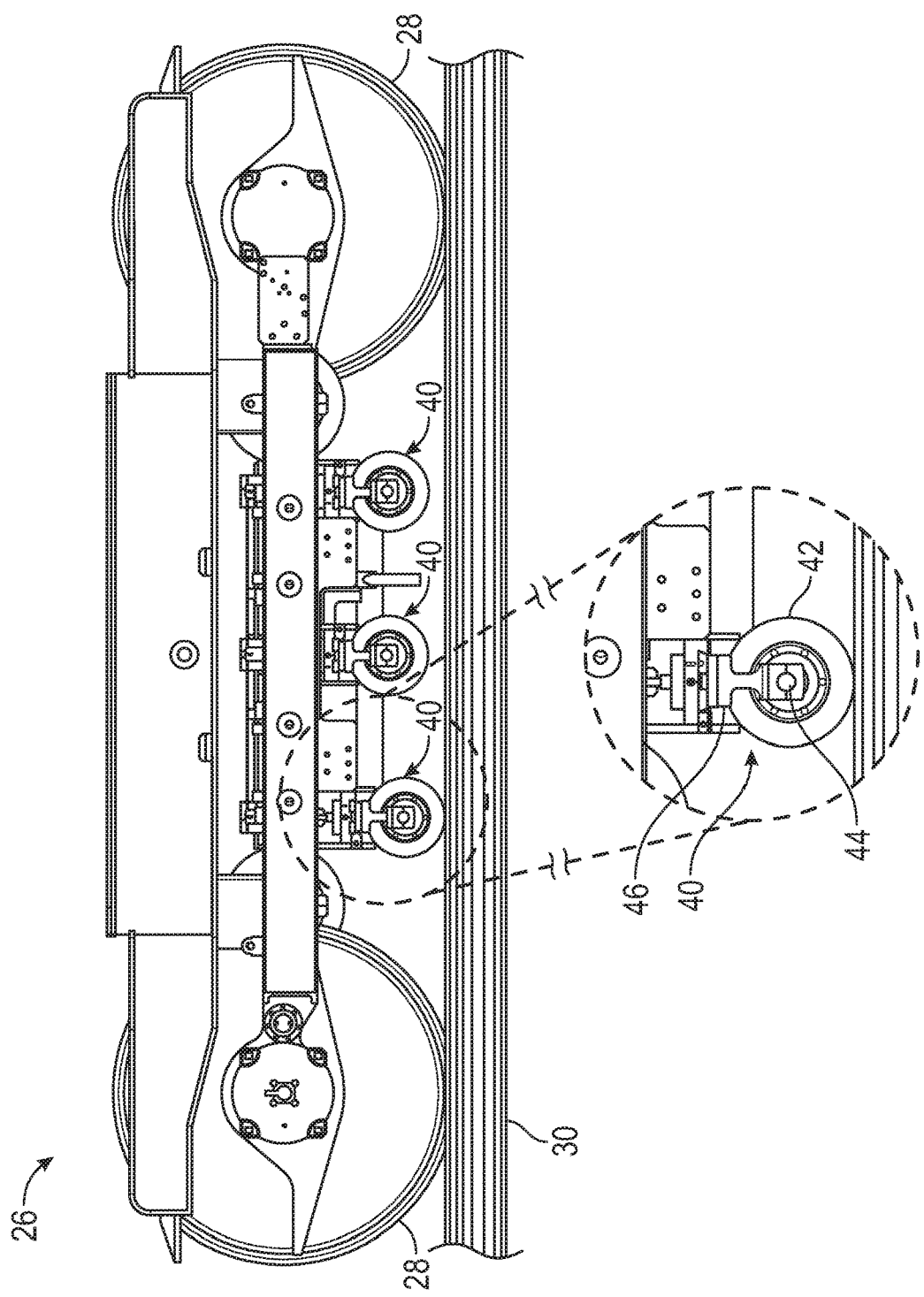

| TestSegment ID | Rail Indicator | Pulse Count | UIC Code/Comment | Confidence |
|---|---|---|---|---|
| 999_DF040117_006 | L | 3066 | 996 BHC | 0.57888943 |
| 999_DF040117_006 | L | 3132 | 996 BHC | 0.714833975 |
| 999_DF040117_006 | L | 3266 | 996 BHC | 0.676444054 |
| 999_DF040117_006 | L | 3332 | 996 BHC | 0.744215548 |
| 999_DF040117_006 | L | 3472 | 996 BHC | 0.880108118 |

FIG. 8

SYSTEM AND METHOD FOR INSPECTING A RAIL USING MACHINE LEARNING

BACKGROUND OF THE DISCLOSURE

The subject matter disclosed herein relates to a system and method for inspecting a rail, and in particular to a system and method for inspecting a rail using machine learning.

Railroad inspection typically involves the use of ultrasonic scanners, induction sensors, eddy current sensors, camera sensors or a combination thereof. Railroad inspection is used to detect features in a rail that could be indicative of a rail flaw. Ultrasonic techniques typically use ultrasonic transducers mounted in pliable wheels of a rail vehicle that rides over the upper surface of the rail. The wheels are filled with a coupling fluid so that the transducers mounted inside can send ultrasonic signals into the rail. The return signals are processed and used to map the locations of flaws in the rail. Once detection data is recorded, it is analyzed to identify patterns in the signals that correspond to rail flaws. These patterns are labeled to differentiate them from signals that do not relate to rail flaws such as bolt holes, rail ends, welds, and noise in the signal.

One issue with the current labeling process is that it is highly labor intensive and it requires many hours of human analysis to identify patterns that correspond to rail flaws. Human analysis is expensive and could potentially result in errors if flaws are missed due to analyst fatigue or lack of experience with a variation of a flaw type. To address these issues, human assessment is often combined with rules-based recognizer software developed to highlight transducer patterns that may indicate a rail flaw. These rule-based systems are typically tuned to accept a large number of false positives rather than risk missing a rail flaw. To remove the false positives, the results output from the rule-based system still have to be assessed by a human analyst resulting in only a moderate reduction in time.

Accordingly, while existing rail inspection systems are suitable for their intended purpose the need for improvement remains, particularly in providing a system and method of inspecting a rail using machine learning.

BRIEF DESCRIPTION OF THE DISCLOSURE

According to an aspect of the disclosure, a vehicle for inspecting a rail is provided. The vehicle includes rail inspection sensors configured for capturing transducer data describing the rail and a processor. The processor is configured for receiving and processing the transducer data in near-real time to determine whether the captured transducer data identifies a suspected rail flaw. The processing includes inputting the captured transducer data to a machine learning system that has been trained to identify patterns in transducer data that indicate rail flaws. The processing also includes receiving an output from the machine learning system, the output indicating whether the captured transducer data identifies a suspected rail flaw. An alert is transmitted to an operator of the vehicle based at least in part on the output indicating that the captured transducer data identifies a suspected rail flaw. The alert includes a location of the suspected rail flaw and instructs the operator to stop the vehicle and to perform a repair action.

According to other aspects of the disclosure, methods, systems, and computer program products for inspecting a rail are provided. A non-limiting example method includes receiving transducer data from rail inspection sensors mounted on a vehicle that is located on the rail. The transducer data is processed to identify locations of suspected rail flaws in the rail. The processing includes inputting the transducer data in a form suitable for a machine learning system that has been trained to identify patterns in the transducer data that indicate rail flaws. Output that includes a list of suspected rail flaws and their corresponding locations on the rail is received from the machine learning system. A repair action is initiated based on the list of suspected rail flaws.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 1A, 1B, 1C, and 1D depict a rail inspection system according to an embodiment of the present invention;

FIG. 8 is an example of a flaw suspect list table according to an embodiment of the invention;

Figure 1A:
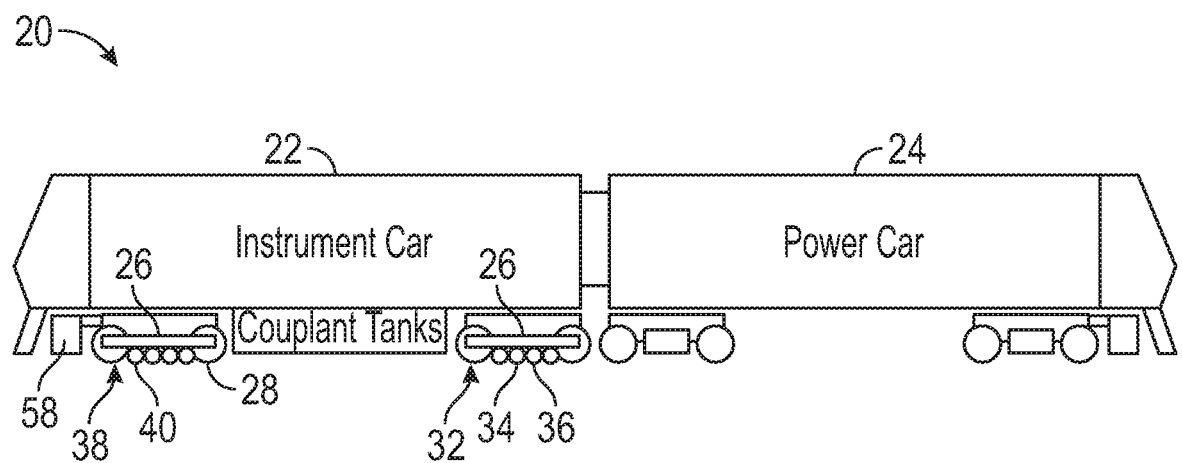

The detailed description explains embodiments of the disclosure, together with advantages and features, by way of example with reference to the drawings.

DETAILED DESCRIPTION OF THE DISCLOSURE

Embodiments of the present invention are directed to a system and method for inspecting rails, such as those used with railroad tracks, using machine learning. Embodiments of the present invention provide advantages in providing automated detection of rail flaws at the accuracy level of a human analyst. The automated detection of rail flaws is performed at greater speed than human analysts and without the potential to suffer from fatigue. Embodiments of the present invention use a branch of machine learning known as deep learning neural networks to build a recognizer by training it on many thousands of examples of correctly identified flaws from human analysts. Deep learning tools that can be utilized by embodiments include, but are not limited to, convolution neural networks (CNN) to perform image recognition of segments of data, and recurrent neural networks (RNN) including "long short term memory" (LSTM) modules which can improve recognition by providing context to the segments of data.

By using machine learning tens of thousands of hours of training and experience of human analysts are embedded into computer programs, which are run at high speed and in parallel to process bulk quantities of recording runs. In an embodiment, the machine learning system produces rail flaw identifications in the same format as a human operator's results file. It is therefore easy to have it audited for accuracy in the same manner as human operators to determine that the machine learning system is performing to the same standard. The machine learning system can receive additional training at any time by being shown further examples of rail flaws. This would happen, for example, if there were new flaw types or new transducer arrangements to learn.

Embodiments of the present invention may run on a cloud computing platform where the machine learning system receives recording data and returns identification files at a high speed. Embodiments of the present invention also include embedded systems working in real-time on vehicles to aid an operator in situations where it is desired to have the operator immediately stop and verify flaw detections with additional tests. Additional embodiments of the present invention include other machine learning technologies other than neural networks such as, but not limited to: clustering; representation learning; and Bayesian networks. Further additional embodiments of the present invention include different combinations of sensors to provide the input data from which the rail flaw patterns are recognized.

Examples of rail flaws include, but are not limited to: bolt hole cracks, head and web separation, transverse defects, and vertical split heads. Signal patterns that indicate rail flaws are distinguished by exemplary embodiments of the present invention from signals that do not relate to rail flaws such as bolt holes, rail ends, welds, and noise in the signal. Rail flaws are often not detectable by the human eye, for example, bolt hole cracks are often hidden behind a plate holding the bolt holes together. In addition rail flaws can include cracks that are on the underside or internal to the rail.

Referring now to FIGS. 1A, 1B, 1C, and 1D, a rail inspection system 20 that includes an instrument car or vehicle 22 and a power car or vehicle 24 that are configured to operate on rails, such as railroad rails is generally shown. The power vehicle 24 includes an energy source, such as an engine or a motor (not shown) that is configured to move the vehicles 22, 24 along the rails. The power vehicle 24 may be operated by a human operator, remotely operated or autonomously operated. The instrument vehicle 22 includes a carriage 26 with wheels 28. The wheels 28 are adapted to operate on the railroad rails 30.

In one embodiment, the instrument vehicle 22 has two carriages 26. In an embodiment, one of the carriages 26 includes magnetic induction detector system 32 that includes at least a pair of brushes 34 that is in contact with the rail 30. It should be appreciated that in the exemplary embodiment, there are two pairs of brushes 34 in the system 20 with one pair being associated with one rail of the pair of rails 30. The brushes 34 establish a magnetic field around the rail 30 in the area between the brushes 34. An induction sensor unit 36 is positioned just above the rail 30 and is used to sense perturbations in the magnetic field. Signals from the induction sensor unit are sent to a data processing system where the signals the associated perturbations are analyzed and compared with known defect profiles.

The system 20 further includes an ultrasonic sensor system 38 that includes one or more roller search units (RSUs) 40. Each RSU 40 includes a fluid-filled wheel 42 formed of a pliant material that deforms to establish a contact surface when the wheel 40 is in contact with and pressed against the rail 30. The fluid filled wheel 40 is mounted on an axle 44 attached to the RSU frame 46 so that the fluid filled wheel 42 contacts the rail 30 as the carriage 26 is pulled along the rail track 30. The RSU 40 includes at least one ultrasonic transducer 48 mounted inside the fluid filled wheel 42. The ultrasonic transducer 48 is configured and positioned for transmitting ultrasonic beams 50 through the fluid in the wheel 34 and through the contact surface into the rail 30 and for receiving a reflected or return beam from the rail 30. The transducers 48 generate return signals that are transmitted to a data processing system. Based on a signal generated in response to the return ultrasonic beam, defects or undesired conditions in the rail 30 may be identified.

Figure 1D:
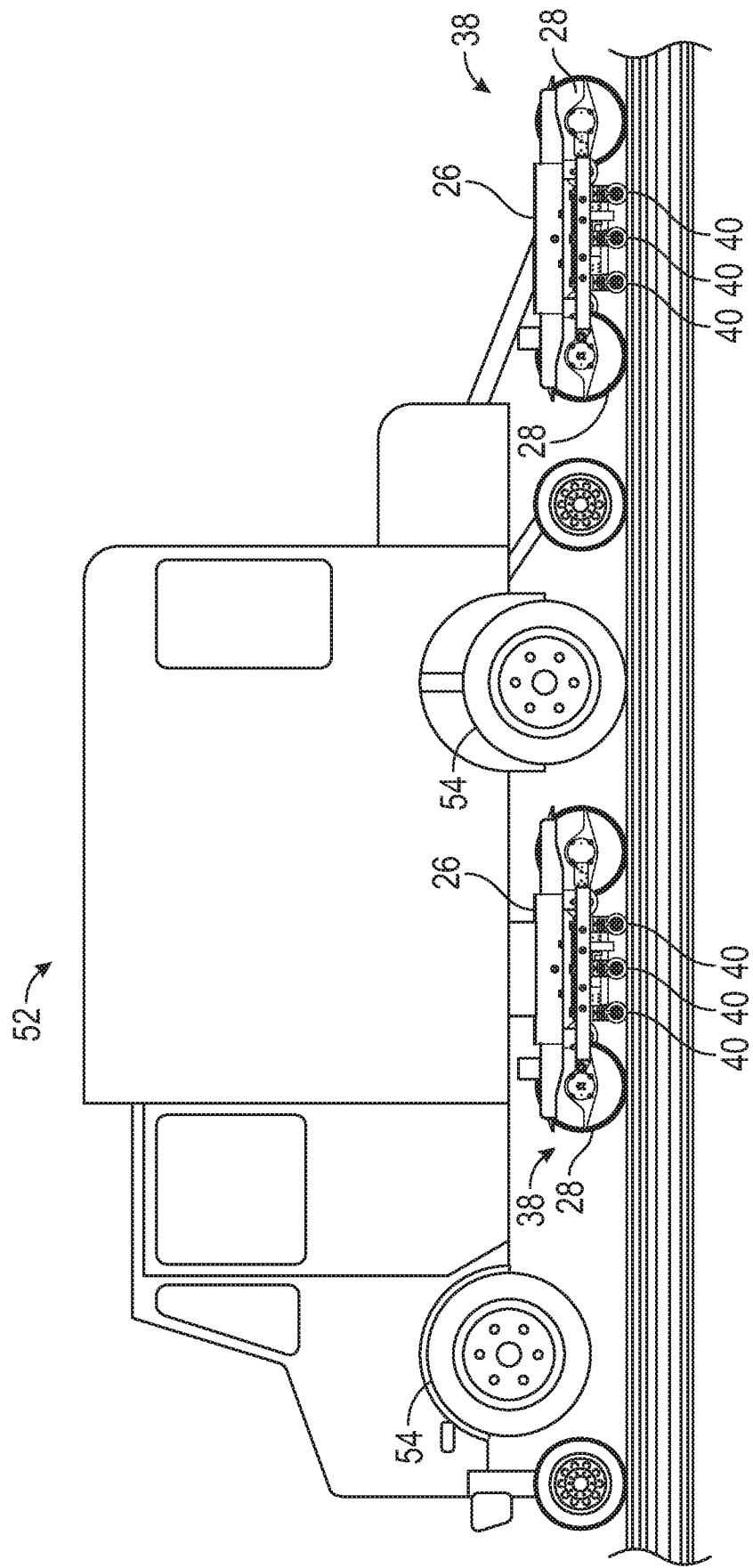

It should be appreciated that the vehicles 22, 24 may be combined into a single vehicle 52, such as that shown in FIG. 1D. In some embodiment, the vehicle 52 may include a second set of wheels 54 that allows the vehicle 52 to drive on roadways and onto the rails 30.

Embodiments of the present invention are described herein use ultrasound trace data as the detection data that is input and analyzed for rail flaws. Embodiments are not limited to data generated by ultrasonic scanners, and can include data generated by any other sensors used to detect rails flaw such as, but not limited to induction sensors and eddy current sensors. In addition, embodiments are also not limited to detection data from a single type of sensor.

One reason that it is difficult for rules-based recognizers to identify a rail flaw because for every example of a rail flaw that fits the rules there will be examples of rail flaws that may be missed because they do not fit the rules (false negatives). There will also be examples of sensor signals that satisfy the criteria of the rules but are not real flaws (false positives). Because of this, rules-based systems are typically tuned to accept large numbers of potentially false positives rather than risk missing a flaw (false negative). Thus, the results still have to be assessed by a human analyst.

Human analysts require many hours of training and then many month/years of experience to become reliable at spotting the numerous types of rail flaws. The analysts must build up the skills or muscle memory through experience to recognize all the variations of rail flaw types. Even highly skilled and experienced analysts can potentially suffer from fatigue and so data is often reviewed by multiple analysts to ensure this does not happen as it could lead to missing potential rail flaws. In addition, small flaw signals can be hidden under noise signals, which can be difficult to detect in high volume situations.

Figures 2A, 2B:
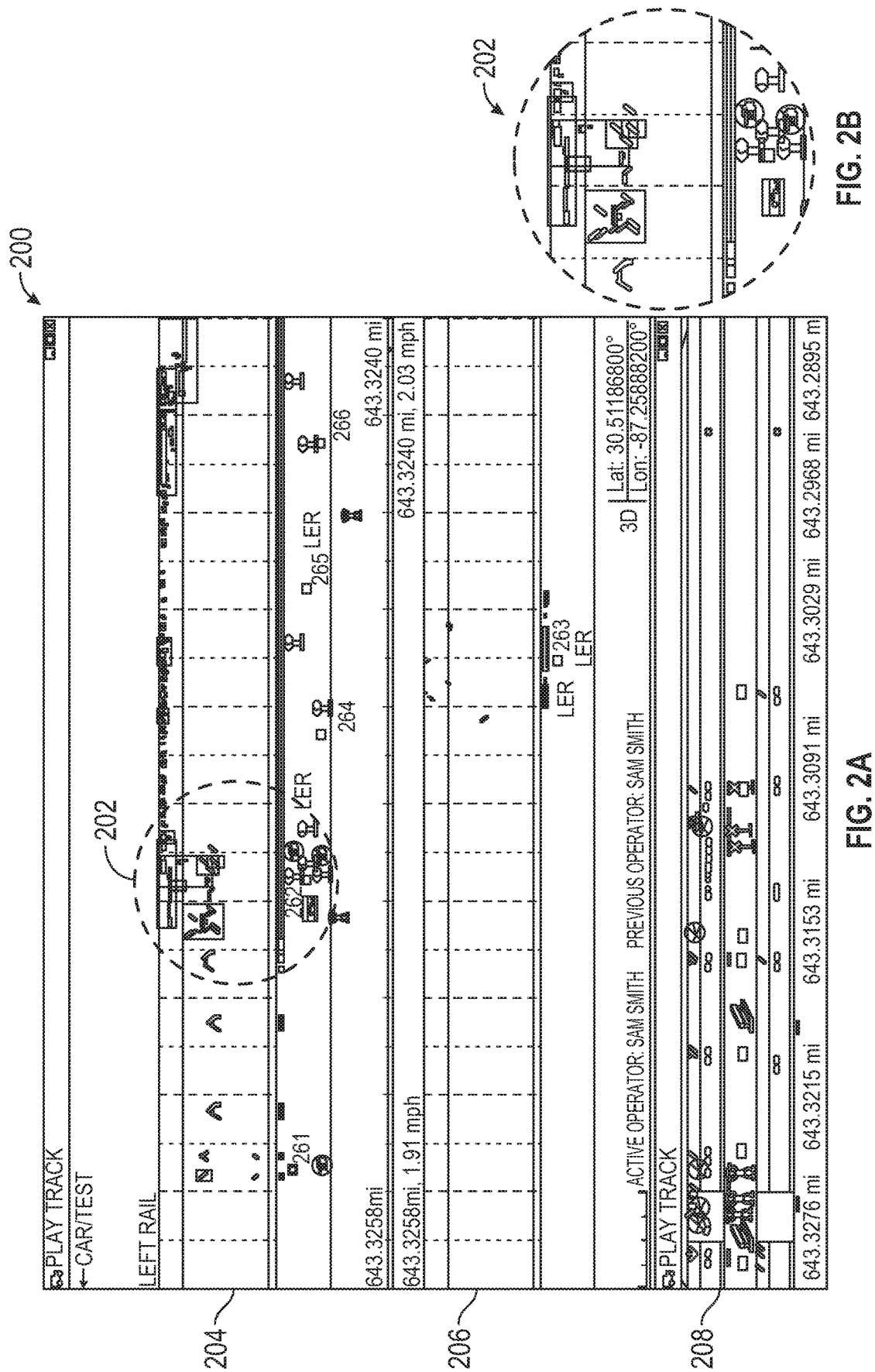
FIG. 2A is a line drawing of an image that is output from a rules-based recognizer of potential rail flaws.
FIG. 2B is a line drawing of a more detailed view of a portion of the image shown in FIG. 2A.

Referring now to FIG. 2A, a line drawing of an image of results 200 that are output from a rules-based recognizer of potential rail flaws is generally shown. The image of results 200 can be generated based on ultrasound trace data that is input to the rules-based recognizer, and includes an image of a left rail 204, a right rail 206, and context data 208 for approximately twelve feet of railroad track. A portion 202 of the image is shown in more detail in FIG. 2B. As shown in FIG. 2B, the rules-based system superimposes boxes over locations having potential rail flaws. As described previously, existing systems require manual analysis of images output by rules-based systems to detect rail flaws. Human analysts are required to review each of the boxes, and possibly additional portions of the image of results 200, to determine if they correspond to a rail flaw. Contemporary rules-based systems tend to over predict and require many person hours to filter out false positives.

Figure 3:
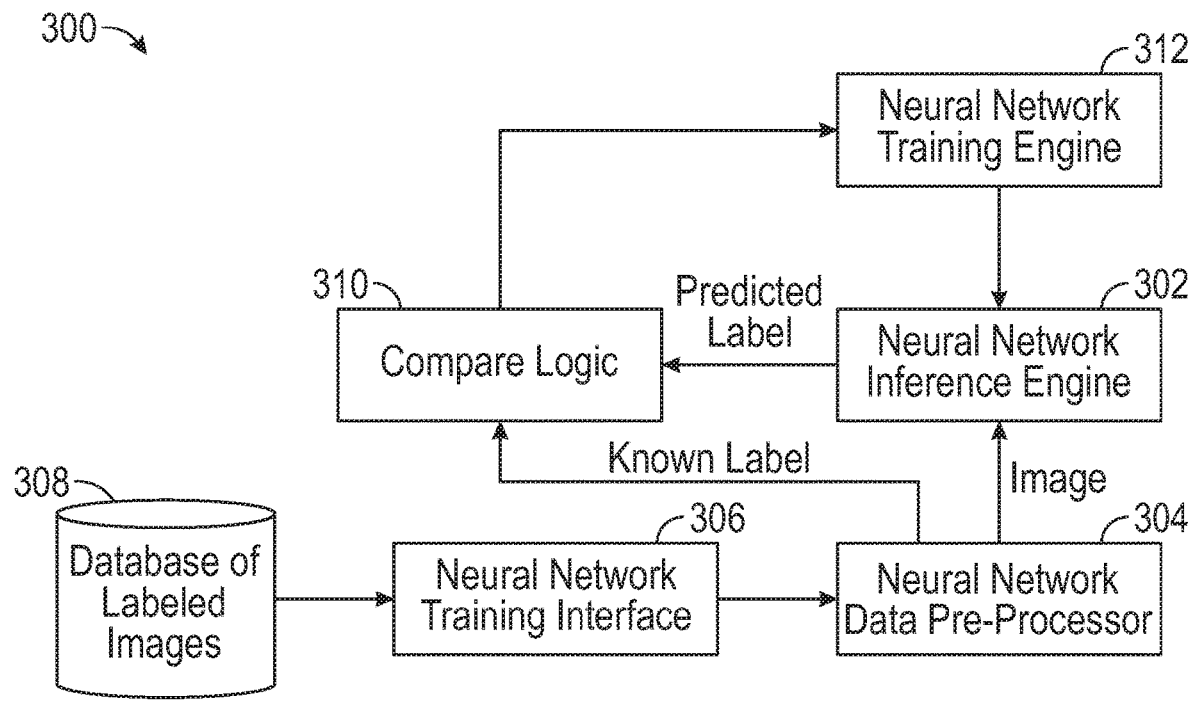
FIG. 3 is a block diagram of components of a system for training a neural network inference engine to recognize rail flaws according to an embodiment of the invention.

Referring now to FIG. 3, a block diagram of components of a system 300 for training a neural network inference engine to recognize rail flaws is generally shown in accordance with an embodiment of the invention. As shown in FIG. 3, a database of labeled images 308 is input to a neural network training interface 306. The database of labeled images 308 shown in FIG. 3 includes detection data, for example, for ultrasound trace data collected by one or more ultrasound scanners, or sensors. The images in the ultrasound trace data have been previously labeled by human analysts. The neural network training interface 306 extracts the images and their corresponding labels for input to neural network data pre-processor 304. The neural network data pre-processor 304 splits the received data into images and associated labels. The images are fed into neural network inference engine 302 (also referred to herein as a "neural network") by the neural network data pre-processor 304 in batches, and labels are predicted for each image. The neural network training pre-processor 304 sends the known, ground truth label of each image to compare logic 310.

As shown in FIG. 3, the predicted label is compared to the known label by the compare logic 310. In exemplary embodiments of the present invention, the compare logic 310 uses a loss function to compare the predicted label with the ground truth label. The results of the comparison are input to neural network training engine 312 to determine adjustments to neural network biases and weightings to improve accuracy and reduce the loss function. The determined adjustments are input to the neural network inference engine 302. The process shown in FIG. 3 is repeated iteratively to minimize the loss function and maximize the accuracy of predictions. In one or more embodiments of the present invention, portions of the neural network shown in FIG. 3 are implemented by off-the-shelf software. For example, the Google Tensorflow open-source Python library of mathematical routines can be used to implement the neural network.

In one or more embodiments of the present invention, the neural network inference engine 302 implements a deep learning convolution neural network (DLCNN) to perform the image pattern recognition. The neural network inference engine 302 can also use a model based on a long short-term memory (LTSM) recurrent neural network to identify rail flaws of indeterminate length. These two approaches can be combined to allow detailed image recognition but provide contextual information from the recurrent neural network. In one or more embodiments of the present invention, instead of, or in addition to, a neural network, a simpler statistical or rules-based technology is utilized as good results may be possible with enhancements of the existing rules based approach for some types of detection. An example of this might be to mark sections of high noise as unsuitable for analysis. In one or more embodiments of the present invention, full coverage of the various rail flaw types involves the combination of different technologies for identifying rail flaws. For example bolt hole cracks and transverse defects are often of limited length and can be detected by DLCNN alone. Head and web separation and vertical split heads can be of indeterminate length and respond better to recurrent neural networks such as LTSMs. A combination of the two combines detailed pattern recognition with contextual information.

Once the neural network is trained to a desired level of accuracy and has been tested against previously unseen data, the training components are removed and the neural network can be used as a recognizer.

There are a variety of times when retraining of the neural network can be useful, for example, after a new transducer layout, after the addition of transducers (e.g. adding induction sensor inputs to the ultrasound input), and new types of suspected rail flaws appearing on the rails.

Figure 4:
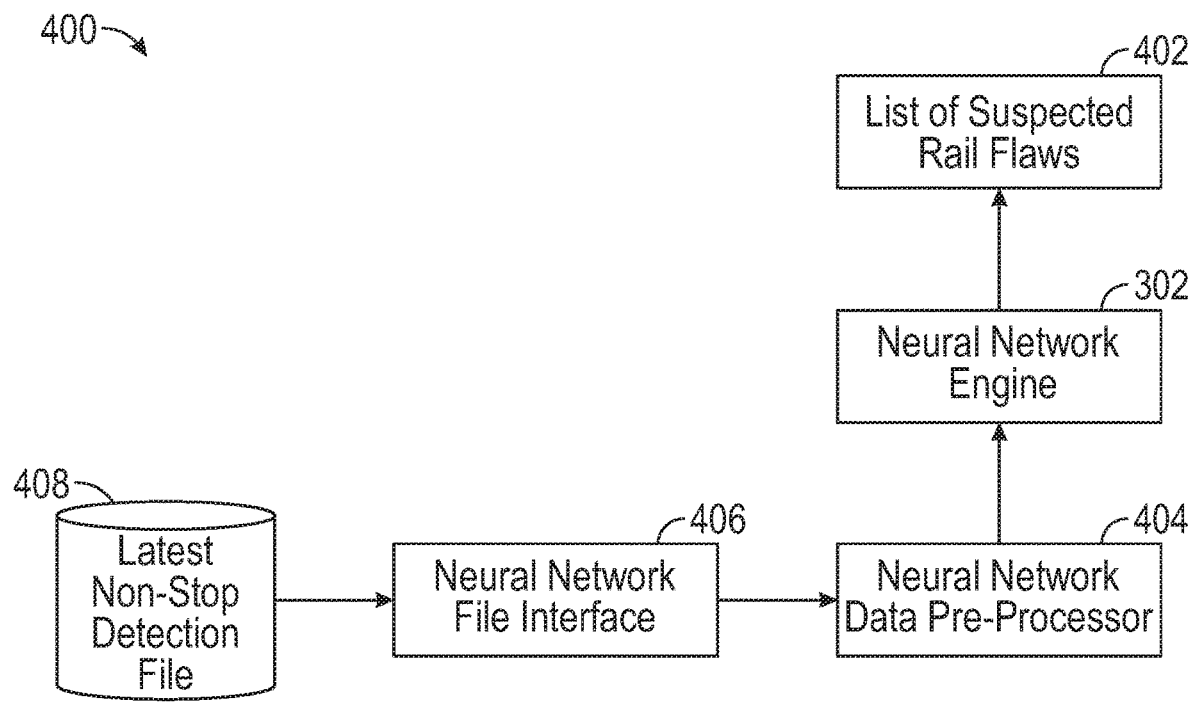
FIG. 4 is a block diagram of components of a system for using a neural network inference engine to recognize rail flaws according to an embodiment of the invention.

Referring now to FIG. 4, a block diagram of components of a system 400 for using a neural network inference engine to recognize rail flaws is generally shown in accordance with an embodiment of the invention. As shown in FIG. 4, a latest non-stop detection file 408 that contains the latest non-stop detection data is read by a neural network file interface. Non-stop detection data refers to transducer data that has been logged as part of the acquisition process. This is typically uploaded to a network location at the end of an acquisition run. The arrival of a new data file will typically automatically trigger the rest of the process described here. In an embodiment, the non-stop detection file 408 contains ultrasound trace data collected by one or more ultrasound sensors. The neural network file interface 406 feeds contents of the non-stop detection file 408 to neural network data pre-processor 404. The neural network training pre-processor 404 converts the transducer data in the detection file into a format suitable for the neural network, which would typically be a series of overlapping 2-dimensional images of the hit patterns, though could also be a 1-dimension signal of, for example, induction sensor detections, and feeds them into neural network inference engine 302 in batches or as a continuous stream. The neural network inference engine 302 determines if any of the received images or sections of the data stream, indicate a rail flaw. A list of suspected rail flaws 402 is output by the neural network inference engine 302. The output can be a table in the form of a text file such as .csv or .xml. An example table is shown below in FIG. 8. In an embodiment, the list of suspected rail flaws 402 is stored in a reporting database that can be used by personnel following up on the suspected rail flaws 402 to verify the existence of the suspected rail flaws 402 by performing more detailed tests using hand probes, and to take repair action if required.

In accordance with one or more embodiments of the present invention, the transducer data is recorded and the processing described with reference to FIG. 4 is performed off-line, for example in the cloud and/or back at an office with a service level agreement of turn-around time (e.g., 24 hours).

Figure 5:
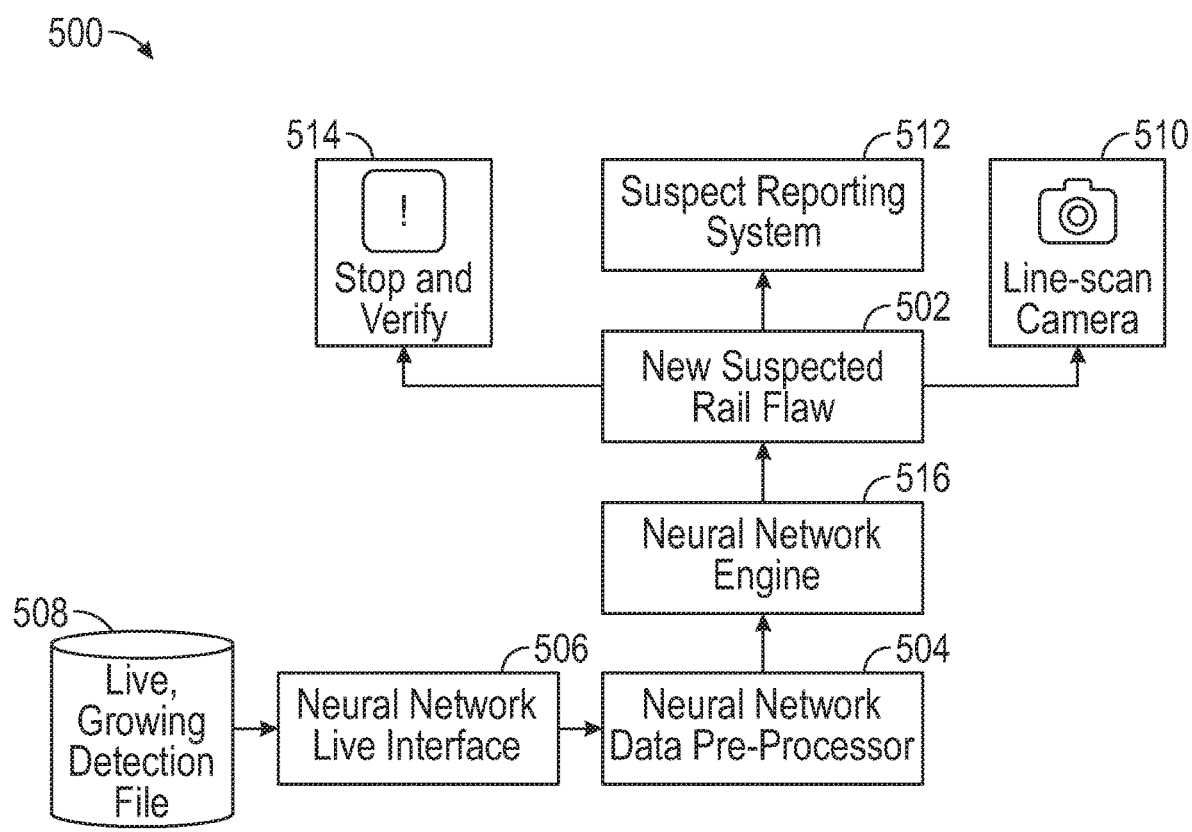
FIG. 5 is a block diagram of components of a system for using a neural network to recognize rail flaws using live data according to an embodiment of the invention.

Referring now to FIG. 5, a block diagram of components of a system 500 for using a neural network to recognize rail flaws using live data is generally shown in accordance with an embodiment of the invention. The system 500 includes a local copy of neural network inference engine 302, shown as neural network inference engine 516. As shown in FIG. 5, one or more embodiments of the present invention can be embedded in a live measurement system (e.g., a rail car performing the inspection) so that live data can be streamed in and recognitions identified in near-real time. As used herein the term near-real time refers to a negligible amount of time, such as the amount of time that takes to collect the data (e.g., image) and for the neural network to process the data.

As shown in FIG. 5, contents of a live, growing detection file 508 are read by a neural network live interface 506. Contents of the live, growing detection file 508 include data that is currently being collected by the rail car where the system 500 is located. In an embodiment, the live, growing detection file 508 contains ultrasound trace data collected by one or more ultrasound sensors on the rail car. The neural network live interface 506 streams the growing detection data 508 as it is collected to neural network data preprocessor 504. The neural network data pre-processor 504 extracts images from the detection data and feeds them into neural network inference engine 516 as a continuous stream. The neural network inference engine 516 determines if the image indicates a rail flaw. If the image has characteristics of a rail flaw, then it is output as a new suspected rail flaw 502.

As shown in FIG. 5, the identification of a new suspected rail flaw 502 can trigger an alert 514 for the rail vehicle to stop and allow for verification by hand sensors. In addition, or alternatively, the identification of a new suspected rail flaw 502 can trigger an image to be captured, of the section of rail that corresponds to the new suspected rail flaw 502, from a buffer of a line-scan camera 510 located on the rail vehicle. It is noted that rail flaws are often difficult or impossible to see in the camera image however, the camera image is still useful to help identify the exact section of railway track containing the flaw. For example, the camera image can be used to aid the operator who is performing the verification by hand sensors. The alert 514 or identifying information about the rail flaw such as the camera image can also be sent to a specified user device and/or computer not located on the rail vehicle.

As shown in FIG. 5, a suspect reporting system 512 can uploaded (e.g., via a wireless network) a list of the new suspected rail flaws 502 to a database not located on the rail car. In an embodiment, one or both of the result of the verification by hand sensors and the image captured by the line-scan camera 510 can also be uploaded to the database by the suspect reporting system 512.

Figure 6:
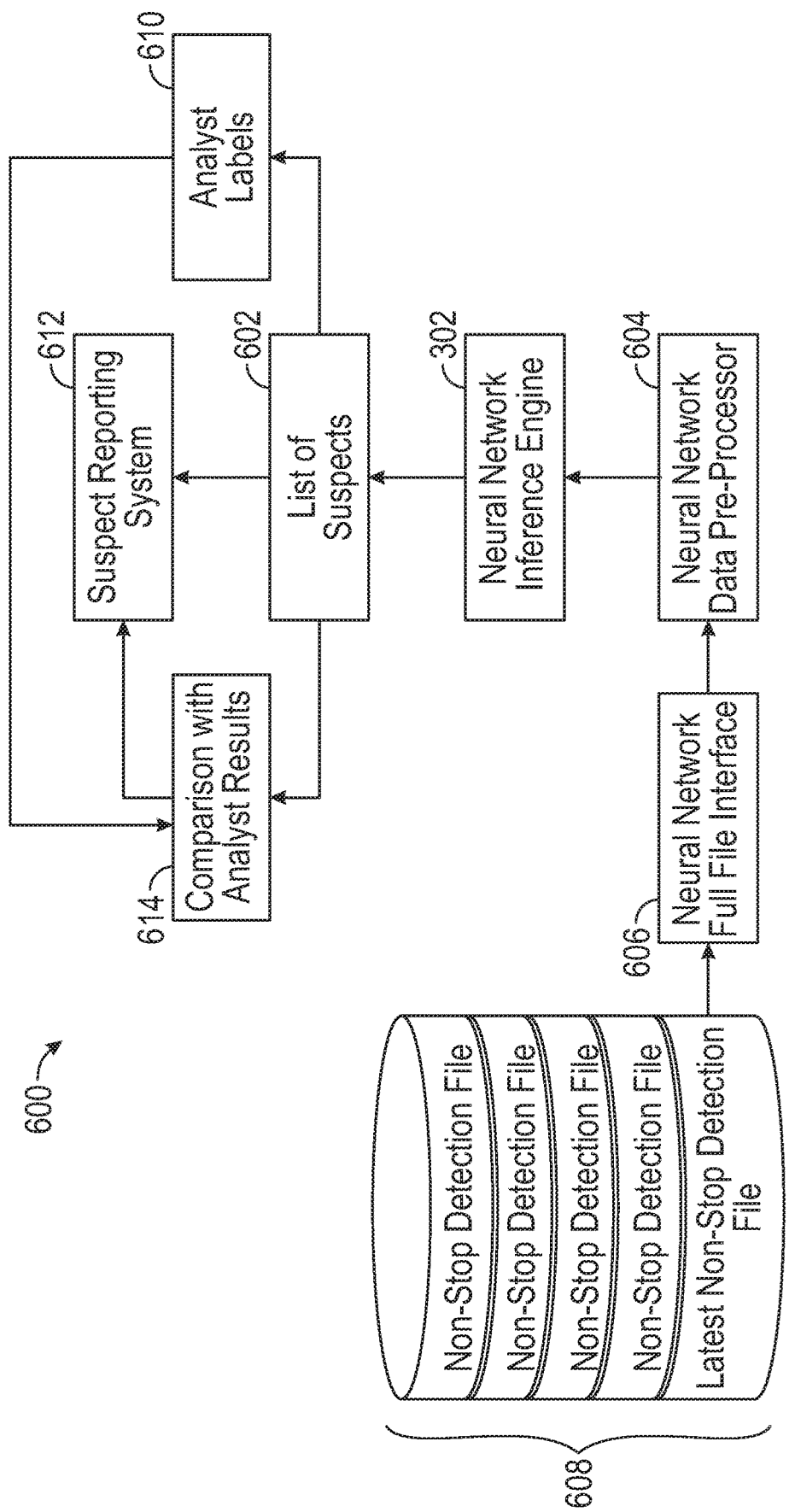
FIG. 6 is a block diagram of components of a system for auditing the accuracy of a neural network inference engine according to an embodiment of the invention.

Referring now to FIG. 6, a block diagram of components of a system 600 for auditing the accuracy of a neural network is generally shown in accordance with an embodiment of the invention. The system shown 600 in FIG. 6 can be run in a cloud environment where non-stop detection files 608 are uploaded from one or more geographic locations to auditing software. The neural network full file interface 606 feeds the detection files 608 to neural network data pre-processor 604. The neural network training pre-processor 604 extracts the images from the detection files 608 and feeds them into neural network inference engine 302 in batches or as a continuous stream. The neural network inference engine 302 determines if any of the received images indicate a rail flaw. A list of suspected rail flaws 602 is output by the neural network inference engine 302.

In an embodiment, the list of suspected rail flaws 602 is downloaded and added to a database of suspected rail flaws in the same format as the output generated by human labelers of rail flaws. In addition, as shown in FIG. 6, the list of suspected rail flaws 602 output from the neural network is input to an analyst labels module 610 where human analysts audit the list of suspected rail flaws 602. The labels provided by the analysts are compared, by a comparison with analyst results module 614, to determine if the list of suspects are also determined to be rail fails by the analysts. The results of the comparison, including any false positives and false negatives, are fed back into the neural network inference engine 302 for continuous improvement. The results of the comparison can also be reported to specified users or sent to an audit result database. The auditing shown in FIG. 6 can be performed automatically on a periodic or non-periodic basis and/or in response to a request to perform auditing or other event.

In accordance with one or more embodiments of the present invention neural network output is validated on a periodic or aperiodic basis by comparing it with human output (e.g. labels). Where false positives and false negatives are found these are added to the network training process by being randomly assigned either to a training set or to a validation set. In this way the training data increases and leads to a more accurate neural network. In addition, adding to the validation set can result in a more statistically significant measure of the accuracy of the neural network. The auditing process can be automated so that the neural networks continually improve their learning. In accordance with an alternate embodiment of the present invention, a new neural network is implemented with no training and it relies on feedback from human detections to gradually teach it new detections. The new neural network is run in the background and not used for rail flaw detection until it reaches the required levels of accuracy.

Figure 7A:
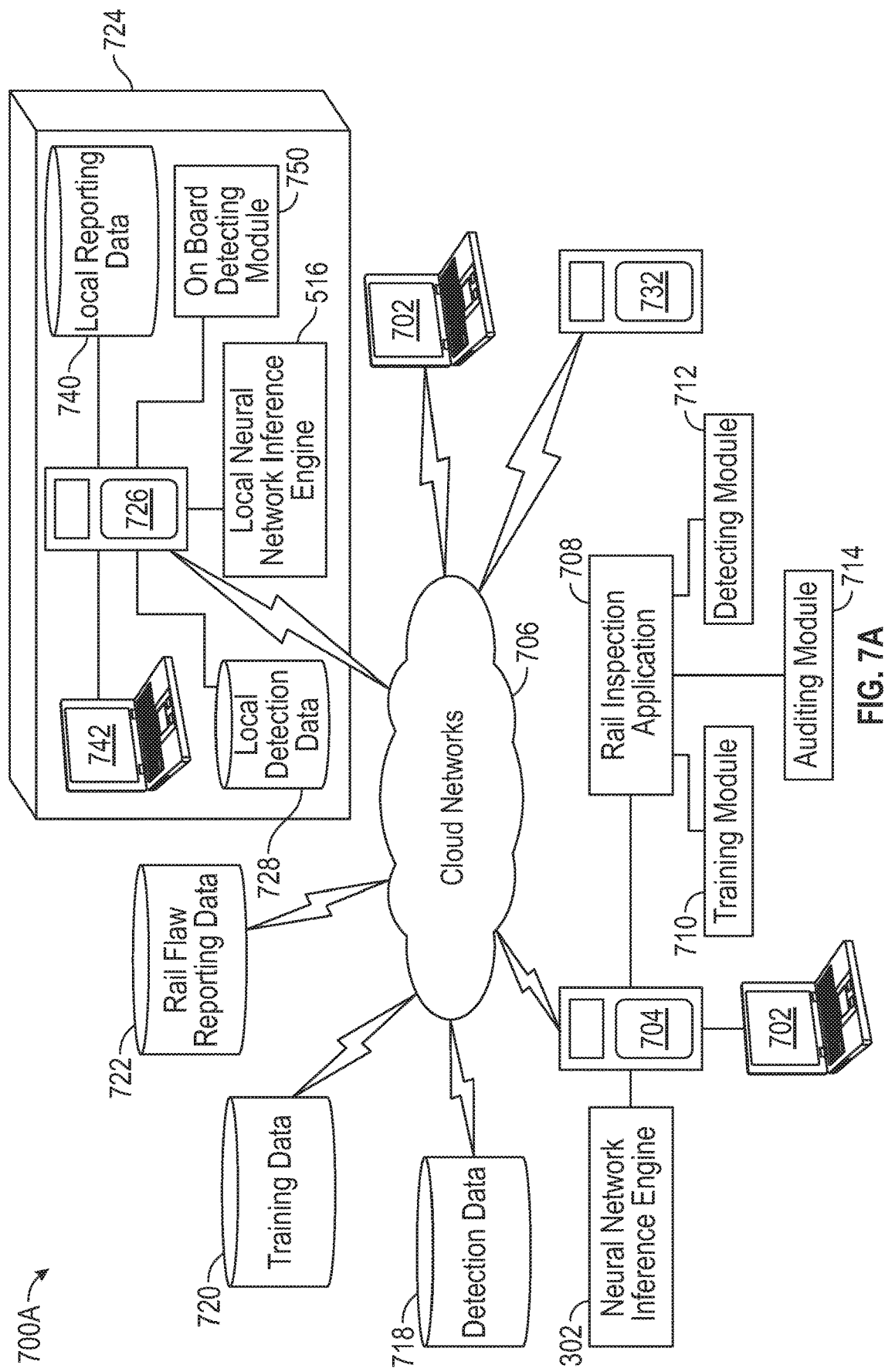
FIG. 7A is a block diagram of a system for using a neural network to recognize rail flaws according to an embodiment of the invention.

Referring now to FIG. 7A, a block diagram of components of a system 700A for using a neural network to recognize rail flaws is generally shown in accordance with an embodiment of the invention.

The system 700A shown in FIG. 7A includes a rail inspection application 708 that is executed by one or more computer programs located on a host computer 704. The rail inspection application 708 includes three modules, a training module 710, a detecting module 712, and an auditing module 714. Any of the modules in the rail inspection application 708 can be initiated by an end user at end user system 702 via cloud networks 706 or by an end user system 702 local to the host computer 704. The modules can also be initiated by computer instructions executing on computer system 732 via networks 706.

Exemplary embodiments of the training module 710 shown in FIG. 7A are implemented by the components and processing described above in reference to FIG. 3 to train the neural network inference engine 302. In an embodiment, the database of labeled images 308 shown in FIG. 3 is stored in the training data storage device 720 and accessed via cloud networks 706. In another embodiment (not shown) the training data storage device 720 is local (accessible without using the cloud networks 706) to the host computer 704 and accessed directly, or contained, by the host computer 704.

The detecting module 712 shown in FIG. 7A can be implemented by the components and processing described in FIG. 4 to utilize the neural network inference engine 302 to detect rail flaws. In an embodiment, the latest non-stop detection file 408 used in FIG. 4 is stored in the detection data storage device 718 and accessed via cloud networks 706. In another embodiment (not shown) the latest non-stop detection file 408 is local to the host computer 704 and accessed directly by the host computer 704. As shown in FIG. 7A, the neural network inference engine 302 is directly connected to the host computer 704 and access is controlled by the host computer 704. Though not shown, the neural network inference engine 302 can be communicatively coupled to the cloud networks 706 and accessible (e.g., to computer system 732) via the cloud networks 706. In an embodiment, the list of suspected rail flaws 402 is stored in the rail flaw reporting data storage device 722 and/or output to end user system 702 or computer system 732. In another embodiment (not shown) the rail flaw reporting data storage device 722 is local to the host computer 704 and accessed directly, or contained, by the host computer 704.

The auditing module 714 can be implemented by the components and processing described in FIG. 6 to audit the accuracy of the results produced by neural network inference engine 302 in detecting rail flaws. In an embodiment, the detection files 608 used in FIG. 6 are stored in the detection data storage device 718 and accessed via cloud networks 706. In another embodiment (not shown) the detection files 608 are downloaded to the host computer 704 and accessed directly by the host computer 704. In an embodiment, the list of suspected rail flaws 402 is stored in the rail flaw reporting data storage device 722 and/or output to end user system 702 or computer system 732. In another embodiment (not shown) the rail flaw reporting data storage device 722 is local to the host computer 704 and accessed directly, or contained, by the host computer 704.

Also shown in FIG. 7A is a rail car 724 that includes a host computer 726, an on-board detecting module 750, a local detection data storage device 728, a local reporting data storage device 740, a local user device 742, and a local neural network inference engine 516 to implement the on-board processing described above with respect to FIG. 5. In an embodiment, the local neural network inference engine 516 is a copy of neural network inference engine 302 that was retrieved via the cloud networks 706 and that is updated when the neural network inference engine 302 is updated. Along with being output to the local end user device 742, the labeled images output from the local neural network inference engine 516 can be sent, via the cloud networks 706 to other end user system 702, other processors such as computer system 732, and/or to the rail flaw reporting data storage device 722. Similarly, copies of data stored in the local reporting data storage device 740 can be uploaded via the cloud networks 706 to the rail flaw reporting data storage device 722, and copies of data stored in the local detection data 728 storage device can with be uploaded via the cloud networks 706 to the detection data storage device 718.

The end user system 702 shown in FIG. 7A may be implemented using general-purpose computers executing a computer program for carrying out the processes described herein. Each of the end user systems 702 may be a personal computer (e.g., a desktop, a laptop, a tablet computer, a smart phone) or a host attached terminal. If an end user system 702 is a personal computer, the processing described herein may be shared by the end user system 702 and the host computer 704. Similarly if end user system 742 is a personal computer, the processing described herein may be shared by the end user system 742 and host computer 726.

The cloud networks 706 may include one or more of any type of known networks including, but not limited to, a wide area network (WAN), a local area network (LAN), a global network (e.g. Internet), a virtual private network (VPN), and an intranet. The cloud networks 706 may include a private network in which access thereto is restricted to authorized members. The cloud networks 706 may be implemented using wireless networking technologies or any kind of physical network implementation known in the art. The components shown in FIG. 7A may be coupled to one or more other components through multiple networks (e.g., Internet, intranet, and private network) so that not all components are coupled to other components through the same networks.

It will be understood by one of ordinary skill in the art that other network configurations may be utilized for realizing the advantages of embodiments of the present invention. The configuration shown in FIG. 7A is for illustrative purposes and is not to be construed as limiting in scope.

As indicated above, the storage devices 718, 720, and 722 are accessible through cloud networks 706. The storage devices 718, 720, and 722 may be implemented using a variety of devices for storing electronic information. It is understood that one or more of the storage devices may be implemented using memory contained in the host computer 704 or may be separate physical devices, as illustrated in FIG. 7A. The storage devices may be logically addressable as a consolidated data source across a distributed environment that includes the cloud networks 706. Information stored in the storage devices may be retrieved and manipulated via the host computer 704 and authorized users of 702, 726, 742, and 732.

The host computer 704 depicted in FIG. 7A may be implemented using one or more servers operating in response to a computer program stored in a storage medium accessible by the server. The host computer 704 may operate as a network server (e.g., a web server) to communicate with the end user systems 702. The host computer 704 may also operate as an application server. The host computer 704 executes one or more computer programs, including a rail inspection application 708, to perform the functions described herein. Processing may be shared by the end user system 702 and/or the computer system 732 by providing an application to the end user system 702 and/or computer system 732. Alternatively, the end user system 702 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 7B:
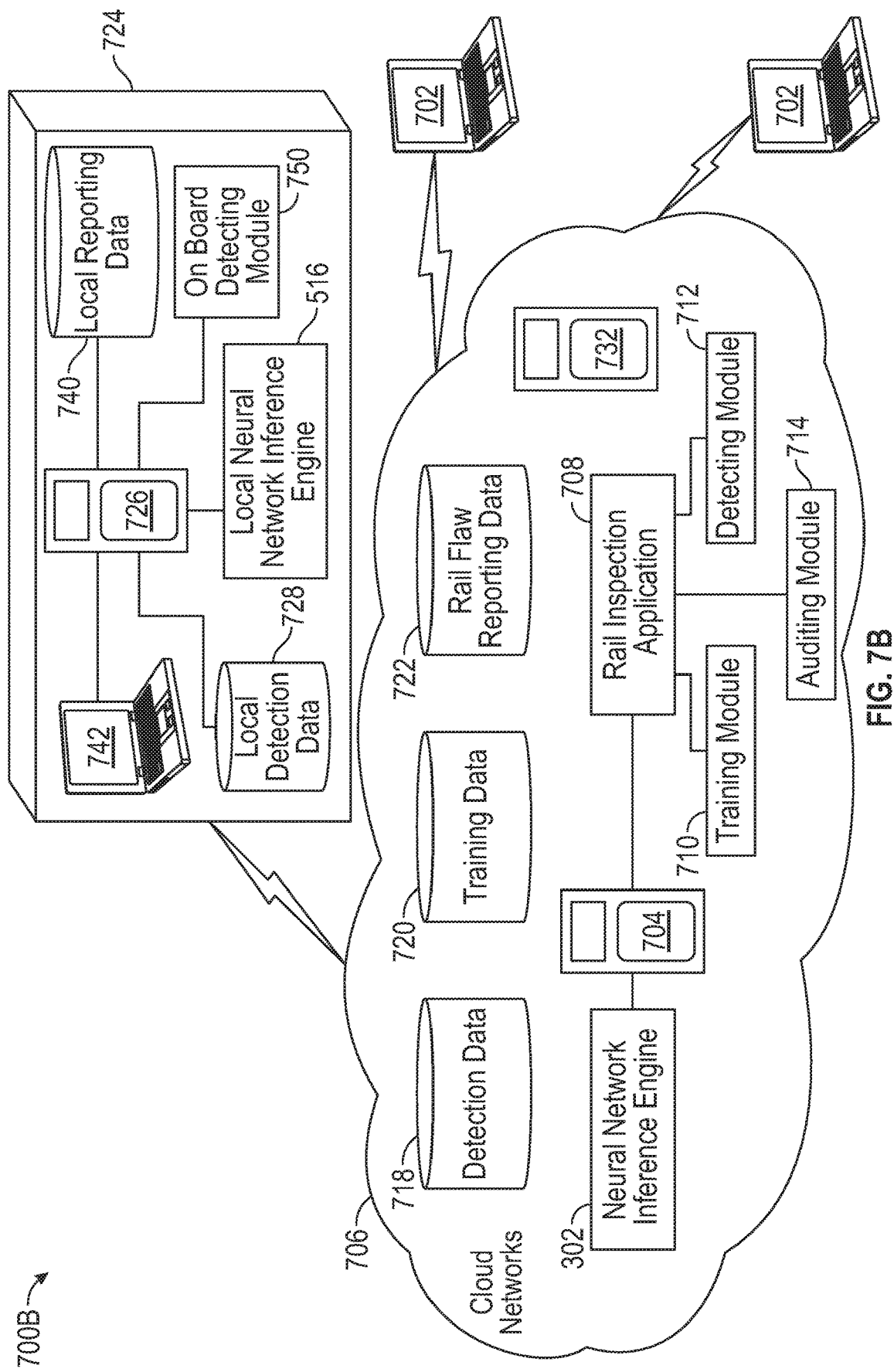
FIG. 7B is a block diagram of a system for using a neural network in a cloud environment to recognize rail flaws according to an embodiment of the invention.

Referring now to FIG. 7B, a block diagram of components of a system 700B for using a neural network in a cloud environment to recognize rail flaws is generally shown in accordance with an embodiment of the invention. The system 700B shown in FIG. 7B has components that are similar to those described above with reference to FIG. 7A, however several of the components are located within the cloud networks 706. As shown in FIG. 7B, the storage devices 718, 720, and 722, the host computer 704, the computer system 732, the neural network inference engine 302, and the rail inspection application 708 (including training module 710, detecting module 712, and auditing module 714) are located within the cloud networks 706; and accessed via the end user systems 702. In addition, the host computer 726 located in the rail car 724 can also access the components via the cloud networks. The system 700B shown in FIG. 7B may be implemented via a cloud computing architecture and use cloud services such as, but not limited to Amazon Web Services.

Referring now to FIG. 8, an example of a flaw suspect list table 800 is generally shown in accordance with an embodiment of the invention. In an embodiment, the flaw suspect list table 800 is output in the form of a text file such as, but not limited to .csv or .xml. The flaw suspect list table 800 shown in FIG. 8 includes a Test Segment Id column 802 which identifies a data acquisition recording run on the railway track of the suspected rail flaw, a Rail Indicator column 804 which identifies if the suspected flaw is in the left or right rail, a Rail Pulse Count column 806 which represents the distance along the track from the start of recording; a UIC Code/Comment column 806 which identifies an International Union of Railways (UIC) code, or an in-house variation on this, corresponding to a type of the suspected rail flaw (UIC code) and a comment which includes text to describe the suspected rail flaw, and a Confidence column 810 which indicates a level of confidence of the neural network in its assessment of the suspected rail flaw. The Test Segment ID, Rail Indicator and Rail Pulse count can be converted to a unique position on the railroad in question in terms of latitude and longitude or milepost and yardage or other railroad base description. This is done by combining this information with meta-data from the run (not shown here). The neural network can be trained to recognize many different types of flaws and features in a rail. Common types include, but are not limited to: bolt hole, bolt hole crack, head and web separation, transverse defects, and vertical split heads.

Figure 9:
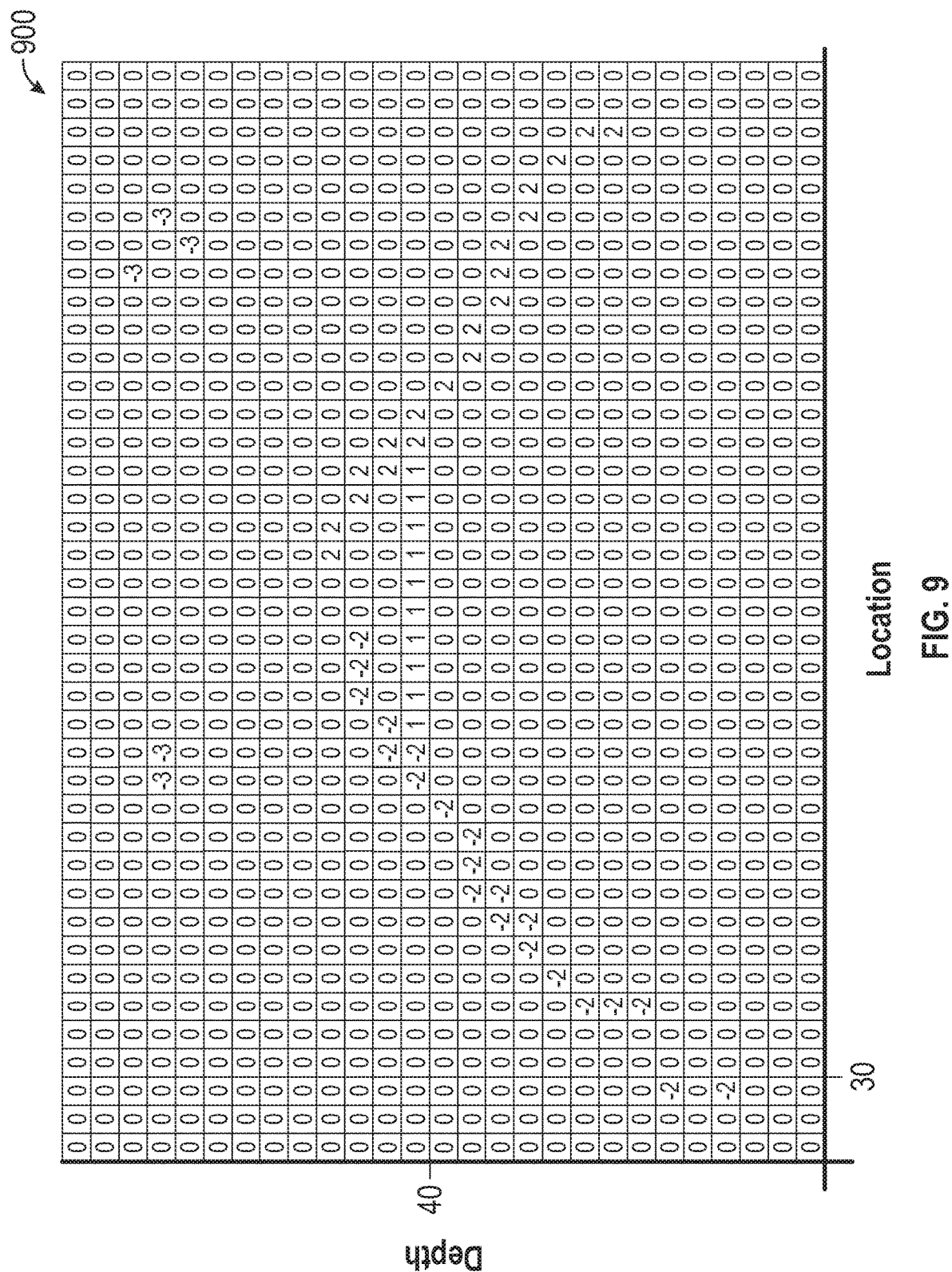
FIG. 9 is an example of an ultrasound scan of a flaw free bolt hole according to an embodiment of the invention.

Referring now to FIG. 9, an example of an ultrasound scan 900 of a flaw free bolt hole is generally shown in accordance with an embodiment of the invention. In an embodiment, a flaw is shown by combining echoes from fourteen or more transducers that can include but are not limited to: ultrasound transducers; induction transducers; and/or eddy-current transducers. The example shown in FIG. 9 depicts an image showing echoes from ultrasound transducers that is input to a neural network for training and/or rail flaw detection. The example shown in FIG. 9 is of a "good" bolt hole meaning that it is not a rail flaw. The different numbers correspond to results from different classes of transducers. In an embodiment, a "−3" refers to echoes from rear transducers at an angle of 70 degrees "−2" to echoes from rear transducers at a negative 45° angle, "−1" to a lack of an expected echo or response (e.g., expected to see rail and didn't), "0" to no echoes received, "+1" to echoes from transducers at a 0° angle (perpendicular to the rail), "+2" to echoes from forward transducers at a plus 45° angle, and "+3" to echoes from forward transducers at a plus 70 degree angle. Similar and/or duplicate transducers can be mapped to the same number. The number mappings above are an example and may be changed when detecting different fault types. The choice of these mappings can have a big effect on the ability of the neural network to learn.

Figure 10:
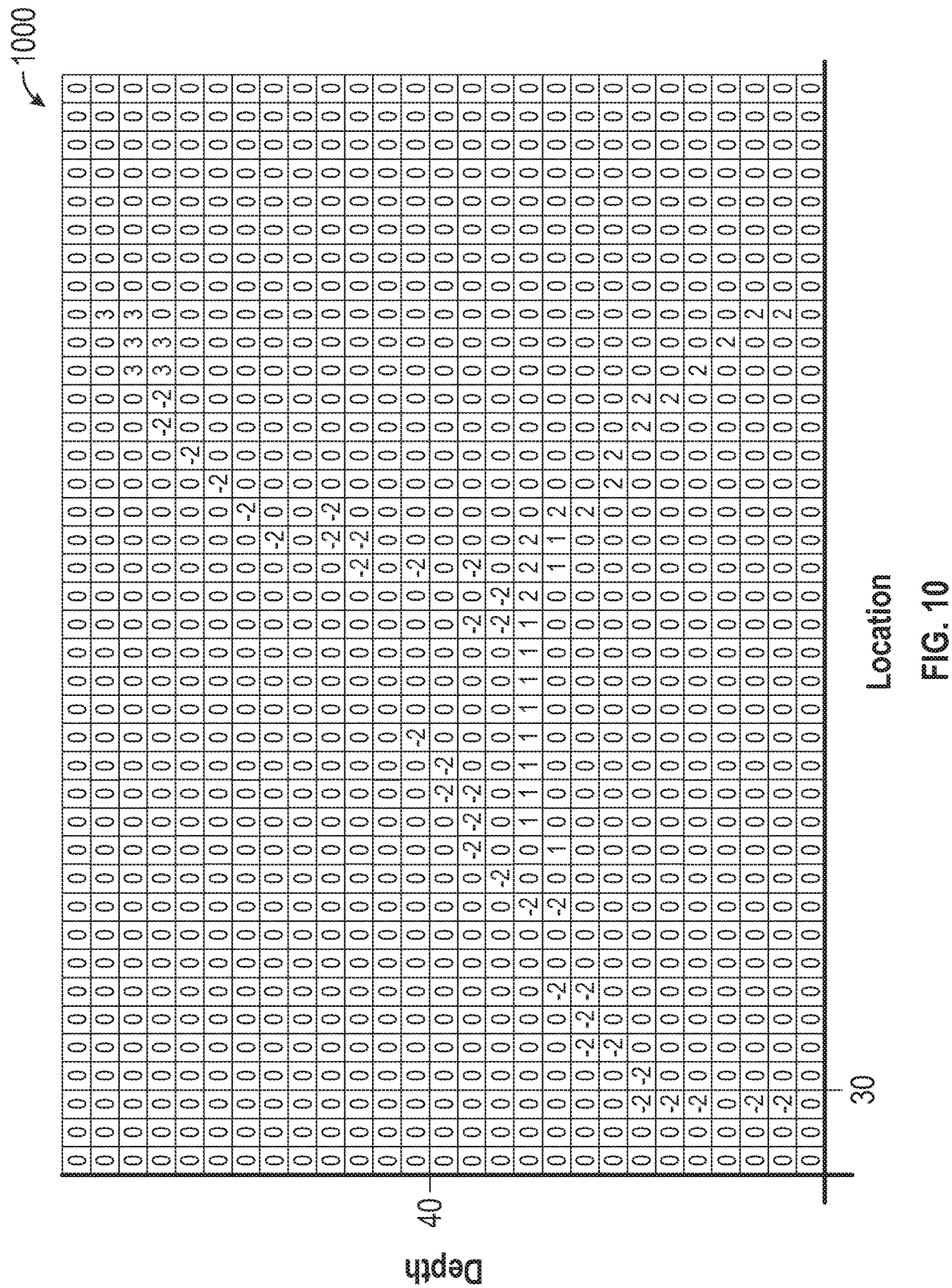
FIG. 10 is an example of an ultrasound scan of a bolt hole with a flaw according to an embodiment of the invention.

Referring now to FIG. 10, an example of an ultrasound scan 1000 of a bolt hole with a flaw is generally shown in accordance with an embodiment of the invention. The example in FIG. 10 shows one example of a large bolt hole crack. It should be noted that there are many variations of bolt hole cracks and how they might appear in an image. For example, smaller bolt hole cracks many only be only a few pixels long, and bolt hole cracks can also appear in different parts of the bolt hole and may be detected by different transducers.

Figure 11:
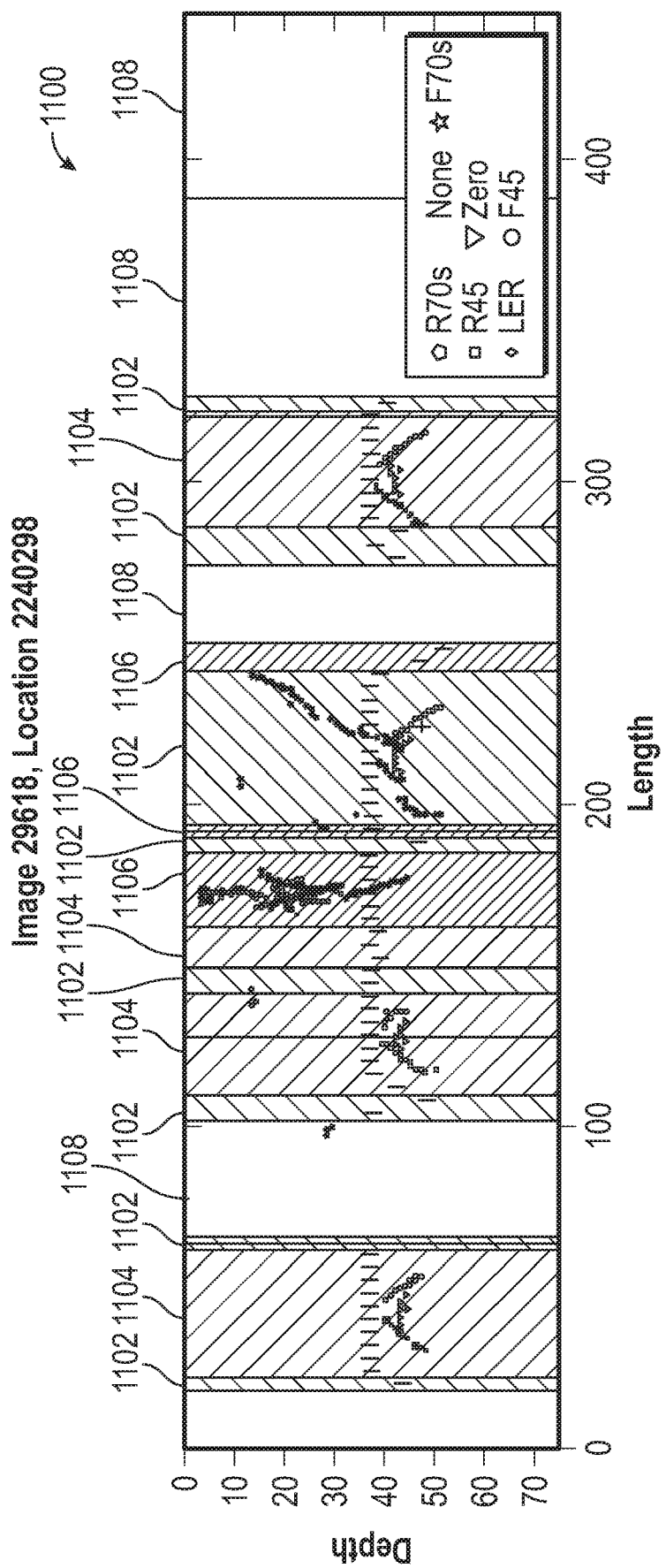
FIG. 11, FIG. 12, and FIG. 13 are examples of outputs from the neural network inference engine according to an embodiment of the invention.
Figure 12:
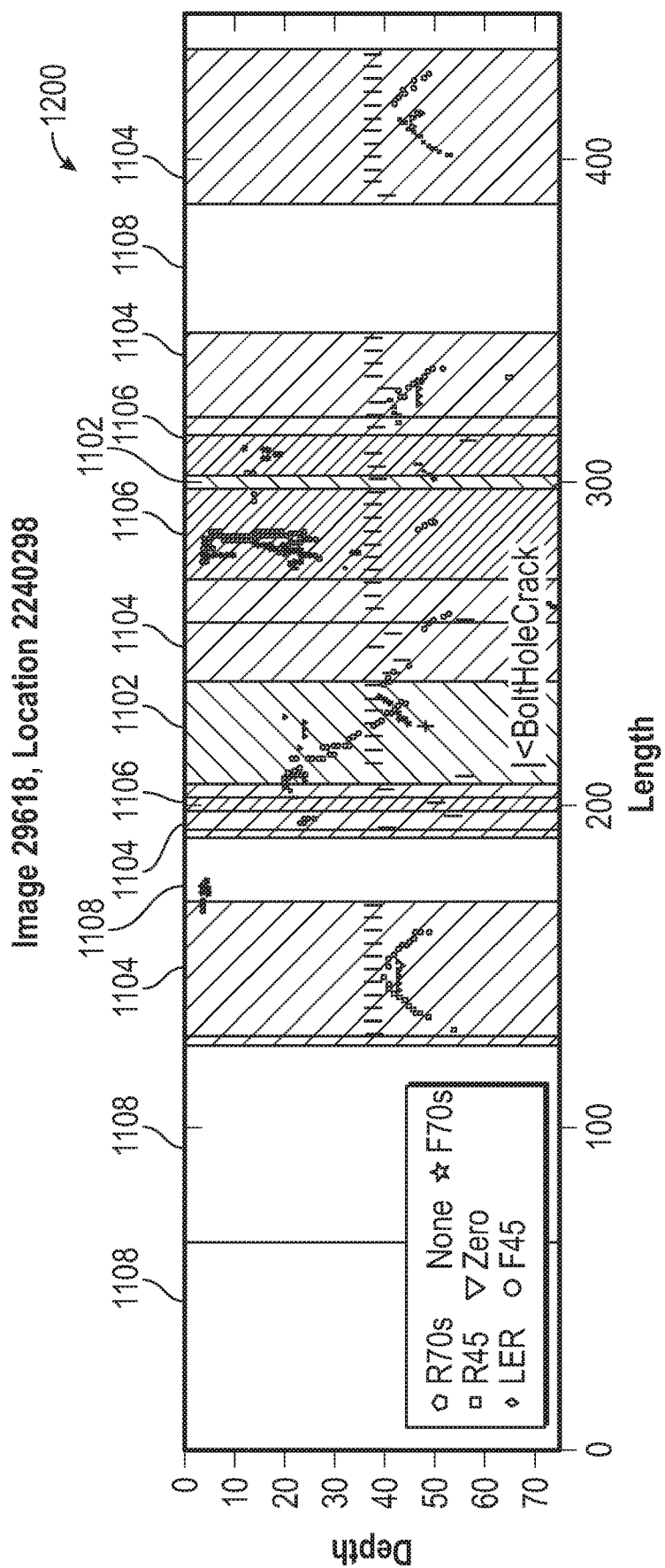
Figure 13:
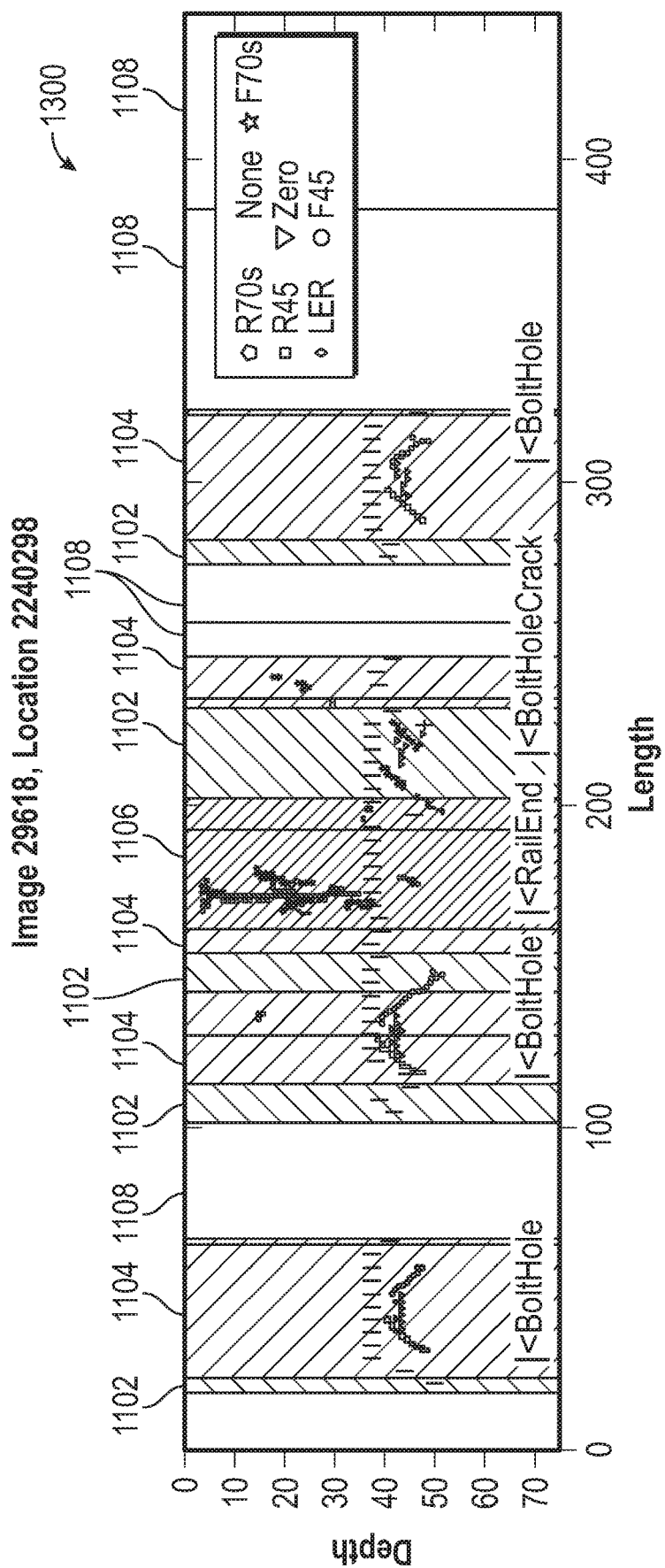

Referring now to FIG. 11, FIG. 12, and FIG. 13 examples of outputs 1100, 1200 and 1300 from a neural network, such as neural network inference engine 302, is generally shown in accordance with an embodiment of the invention. In this example, the neural network has been trained to recognize bolt hole cracks, bolt holes with no cracks, and rail ends. During training the neural network is shown many examples of each of these types as well as examples of noise and other signals so that "unknown" can also be recognized. In an embodiment, the images are streamed into the neural network in an overlapping sequence. In the examples shown in FIGS. 11-13, the images are 80×64 pixels and they overlap by 60 pixels (i.e., 4 pixel increments). The overlapping recognitions (e.g., of bolt hole cracks and bolt holes with no cracks, etc.) are shown by a colored stripe (shown in FIGS. 11-13 as shaded stripes). The portions labeled 1102 indicate suspected bolt hole cracks, the portions labeled 1104 indicate bolt holes with no cracks, the portions labeled 1106 indicate rail ends, and the portions labeled 1108 have unknown contents. The individual recognitions are each given a confidence by the neural network that it has been correctly identified. These are shown in this embodiment as the vertical position of a vertical dash. In this embodiment most are near the maximum confidence (arbitrarily shown as half way up the axis) but a few are lower indicating lower confidence. A higher level of confidence can be achieved by combining the individual stripe confidences in a running filter which will remove occasional false indications. The running filter is also used to give the position of the rail flaw typically shown as the center of a cluster of indications.

Figure 14:
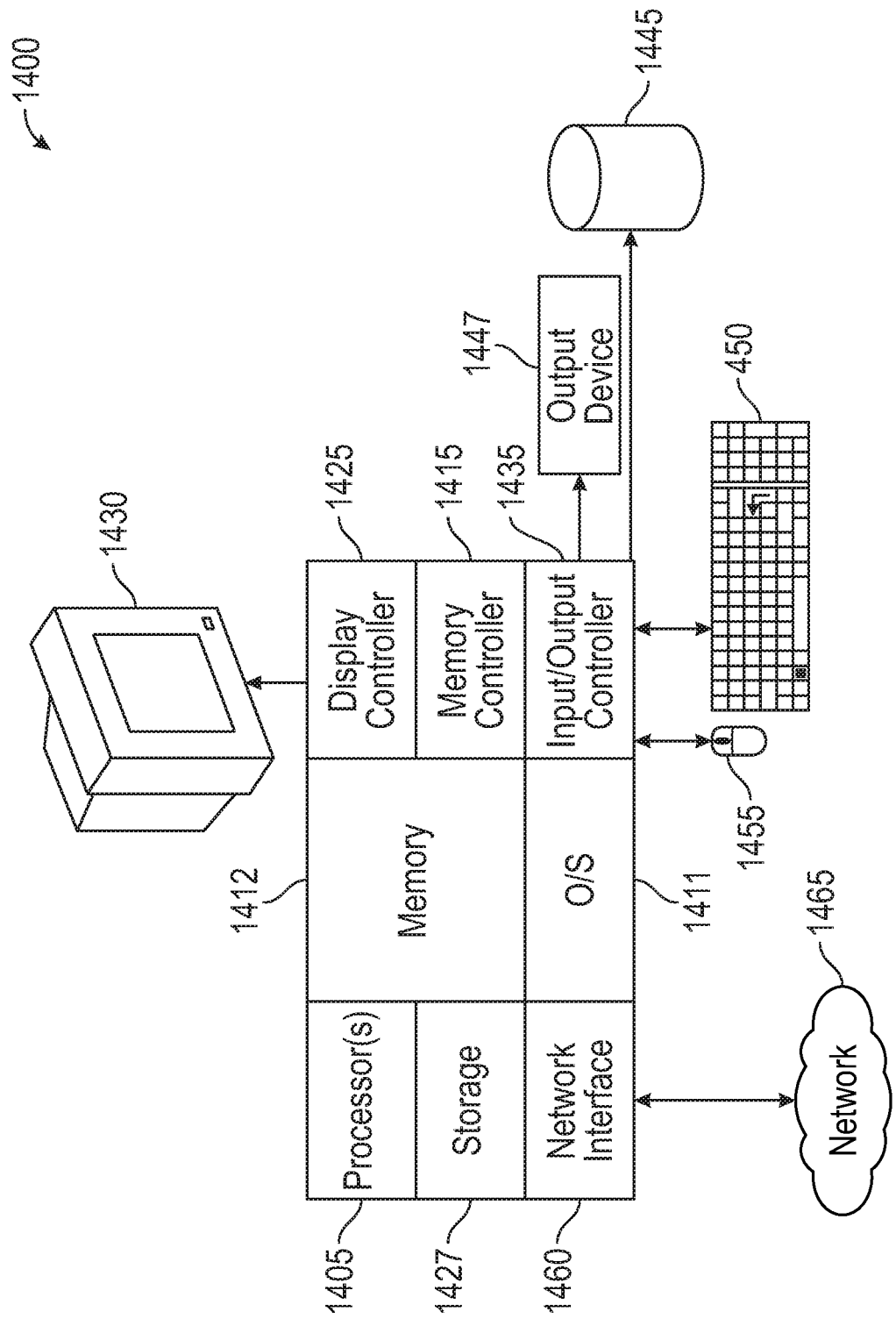
FIG. 14 is a block diagram of a computer system for implementing some or all aspects of inspecting a rail using machine learning according to an embodiment of the invention.

Referring now to FIG. 14, a block diagram of a computer system 1400 for implementing some or all aspects of inspecting a rail using machine learning is generally shown in accordance with an embodiment of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1400, such as a mobile device, personal computer, workstation, minicomputer, or mainframe computer.

In an exemplary embodiment, as shown in FIG. 14, the computer system 1400 includes a processor 1405, memory 1412 coupled to a memory controller 1415, and one or more input devices 1445 and/or output devices 1447, such as peripherals, that are communicatively coupled via a local I/O controller 1435. These devices 1447 and 1445 may include, for example, a printer, a scanner, a microphone, and the like. A conventional keyboard 1450 and mouse 1455 may be coupled to the I/O controller 1435. The I/O controller 1435 may be, for example, one or more buses or other wired or wireless connections, as are known in the art. The I/O controller 1435 may have additional elements, which are omitted for simplicity, such as controllers, buffers (caches), drivers, repeaters, and receivers, to enable communications.

The I/O devices 1447, 1445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1405 is a hardware device for executing hardware instructions or software, particularly those stored in memory 1412. The processor 1405 may be a custom made or commercially available processor, a central processing unit (CPU), an auxiliary processor among several processors associated with the computer system 1400, a semiconductor based microprocessor (in the form of a microchip or chip set), a microprocessor, or other device for executing instructions. The processor 1405 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1412 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1412 may incorporate electronic, magnetic, optical, or other types of storage media. Note that the memory 1412 may have a distributed architecture, where various components are situated remote from one another but may be accessed by the processor 1405.

The instructions in memory 1412 may include one or more separate programs, each of which comprises an ordered listing of executable instructions for implementing logical functions. In the example of FIG. 14, the instructions in the memory 1412 include a suitable operating system (OS) 1411. The operating system 1411 essentially may control the execution of other computer programs and provides scheduling, input-output control, file and data management, memory management, and communication control and related services.

Additional data, including, for example, instructions for the processor 1405 or other retrievable information, may be stored in storage 1427, which may be a storage device such as a hard disk drive or solid state drive. The stored instructions in memory 1412 or in storage 1427 may include those enabling the processor to execute one or more aspects of the dispatch systems and methods of this disclosure.

The computer system 1400 may further include a display controller 1425 coupled to a display 1430. In an exemplary embodiment, the computer system 1400 may further include a network interface 1460 for coupling to a network 1465. The network 1465 may be an IP-based network for communication between the computer system 1400 and an external server, client and the like via a broadband connection. The network 1465 transmits and receives data between the computer system 1400 and external systems. In an exemplary embodiment, the network 1465 may be a managed IP network administered by a service provider. The network 1465 may be implemented in a wireless fashion, e.g., using wireless protocols and technologies, such as WiFi, WiMax, etc. The network 1465 may also be a packet-switched network such as a local area network, wide area network, metropolitan area network, the Internet, or other similar type of network environment. The network 1465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for inspecting a rail using machine learning as described herein can be embodied, in whole or in part, in computer program products or in computer systems 1400, such as that illustrated in FIG. 14.

Technical effects and benefits of some embodiments include providing a system for inspecting a rail, such as that used in railroads, using machine learning. Further technical effects and benefits include providing automated detection of rail flaws at a greater speed and at the accuracy level of a human analyst.

Technical effects and benefits of some embodiments also include the ability to use neural networks deep learning convolution neural networks and/or recurrent neural networks which can provide more accurate results when compared to contemporary approaches that utilize simpler neural networks.

Technical effects and benefits of some embodiments also include the ability to use transducer signals directly, which can result in more accurate predictions when compared to contemporary approaches that utilize statistics as inputs to the training of the neural network. The ability to carry out pattern recognition directly on two-dimensional and three-dimensional representations of sensor results as described herein is not performed by contemporary techniques. In contrast, contemporary approaches vastly simplify the many of thousands of pixels in transducer signals into a handful of statistics that are fed into a simple, non-convolutional, one-dimensional neural network with typically one hidden layer.

Technical effects and benefits of some embodiments further include the ability to train the neural network using tens of thousands of example data points (i.e., labeled data), which can result in more accurate predictions when compared to contemporary approaches that typical train using a few hundred example data points. Data can be mined from a vast library of historic recording logs to provide tens of thousands of data examples to train the neural network. This ability to harvest example data from existing manual recognition processes, and the continual comparison of the neural network results to the manually labeled examples can result in more accurate predictions. The results of the comparison can be sorted into true-positive, false-positive, and false-negative and fed back into the neural network to improve training, to audit the neural network, and to keep the neural network current.

Technical effects and benefits of some embodiments include the ability to run as easily on a stand-along computer as on a powerful cloud based computer. This makes it practical to do the highly computationally intense training process on the cloud, and the recognizer functions in a less computationally intense manner in a number of situations (e.g., performing post-processing transducer data on an office computer or a cloud computer, and performing live processing on a data acquisition vehicle).

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide or perform a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Python, Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A vehicle for inspecting a rail, the vehicle comprising:
   rail inspection sensors configured for capturing transducer data describing the rail; and
   a processor configured for:
      receiving the transducer data; and
      processing the captured transducer data to determine whether the captured transducer data identifies a suspected rail flaw, the processing comprising:
         inputting the captured transducer data as a stream of overlapping sequences in a form suitable for a machine learning system that has been trained to identify patterns in the transducer data that indicate rail flaws, the machine learning system comprising a deep learning convolutional neural network to perform image pattern recognition that is combined with a long short-term memory recurrent neural network to identify rail flaws of the rail of indeterminate length; and
         receiving an output from the machine learning system, the output indicating whether the captured transducer data identifies the suspected rail flaw;
         auditing at least one of the deep learning convolutional neural network or the long short-term memory recurrent neural network to identify at least one of a false positive or a false negative, the auditing comparing the output from the machine learning system to output from a human analyst;
         adjusting the at least one of the deep learning convolutional neural network on the long short-term memory recurrent neural network based on the at least one of the false positive or the false negative; and
         transmitting an alert to an operator of the vehicle based at least in part on the output indicating that the captured transducer data identifies a suspected rail flaw, the alert including a location of the suspected rail flaw and instructing the operator to stop the vehicle and to perform a repair action,
      wherein the stream of overlapping sequences comprises a sequence of overlapping 2-dimensional images.

2. The vehicle of claim 1, further comprising a camera for capturing a camera image of the location, wherein the alert includes the camera image.

3. The vehicle of claim 1, wherein the output is transmitted, via a network, to a remote storage device or a remote processor.

4. The vehicle of claim 1, wherein the rail inspection sensors include one or more of an ultrasonic transducer, an induction transducer, and an eddy current transducer.

5. The vehicle of claim 1, wherein the processing further comprises:
   generating a flaw suspect list table comprising:
      a test segment indicator that indicates a data acquisition recording run on the rail of the suspected rail flaw;
      a rail identifier that identifies whether the suspected rail flaw is in a left rail or a right rail;
      a rail pulse count indicator that indicates a distance along the rail from a start of a recording;
      a code identifier that identifies a code corresponding to a type of the suspected flaw; and
      a confidence identifier that indicates a level of confidence of the machine learning system.

6. The vehicle of claim 1, wherein at least one of the deep learning convolutional neural network or the long short-term memory recurrent neural network is trained by comparing a predicted label associated with a training image to a known label associated with the training image, and wherein the processing is performed in a cloud computing environment.

7. The vehicle of claim 1, wherein the overlapping 2-dimensional images overlap by a predetermined number of pixels.

8. The vehicle of claim 7, wherein the predetermined number of pixels is greater than half the width of the overlapping 2-dimensional images.

9. The vehicle of claim 1, wherein the overlapping 2-dimensional images overlap in all but four-pixel increments.

10. A method for inspecting a rail, the method comprising:
   receiving transducer data from rail inspection sensors mounted on a vehicle that is located on the rail; and
   processing the transducer data to identify locations of suspected rail flaws in the rail, the processing comprising:
      inputting the transducer data as a stream of overlapping sequences in a form suitable for a machine learning system that has been trained to identify patterns in the transducer data that indicate rail flaws, the machine learning system comprising a deep learning convolutional neural network to perform image pattern recognition that is combined with a long short-term memory recurrent neural network to identify rail flaws of the rail of indeterminate length;
      receiving an output from the machine learning system, the output including a list of suspected rail flaws and their corresponding locations on the rail;
      auditing at least one of the deep learning convolutional neural network or the long short-term memory recurrent neural network to identify at least one of a false positive or a false negative, the auditing comparing the output from the machine learning system to output from a human analyst;

adjusting the at least one of the deep learning convolutional neural network on the long short-term memory recurrent neural network based on the at least one of the false positive or the false negative; and initiating a repair action based on the list of suspected rail flaws.

11. The method of claim 10, wherein the transducer data includes images.

12. The method of claim 11, wherein the inputting the transducer data includes streaming overlapped images.

13. The method of claim 10, wherein the transducers include ultrasonic transducers.

14. The method of claim 10, wherein the transducers include induction transducers.

15. The method of claim 10, wherein the transducers include eddy current transducers.

16. The method of claim 10, wherein the receiving is from a requestor via a network and the method further comprises sending the list of suspected rail flaws to the requestor.

17. The method of claim 10, wherein the processing and the initiating are performed by a processor located on the vehicle.

18. The method of claim 10, further comprising, performing the repair action, the repair action comprising performing a verification of one of the suspected rail flaws using a hand held sensor.

19. A system for inspecting a rail, the system comprising:
a non-transitory memory having computer readable instructions; and
one or more processors for executing the computer readable instructions, the computer readable instructions controlling the one or more processors to perform operations comprising:
receiving transducer data from rail inspection sensors mounted on a vehicle that is located on the rail;
processing the transducer data to identify locations of suspected rail flaws in the rail, the processing comprising:
inputting the transducer data as a stream of overlapping sequences in a form suitable for a machine learning system that has been trained to identify patterns in the transducer data that indicate rail flaws, the machine learning system comprising a deep learning convolutional neural network to perform image pattern recognition that is combined with a long short-term memory recurrent neural network to identify rail flaws of the rail of indeterminate length; and
receiving an output from the machine learning system, the output including a list of suspected rail flaws and their corresponding locations on the rail;
auditing at least one of the deep learning convolutional neural network or the long short-term memory recurrent neural network to identify at least one of a false positive or a false negative, the auditing comparing the output from the machine learning system to output from a human analyst;
adjusting the at least one of the deep learning convolutional neural network on the long short-term memory recurrent neural network based on the at least one of the false positive or the false negative; and
initiating a repair action based on the list of suspected rail flaws.

20. A computer program product for inspecting a rail, the computer program product comprising a non-transitory computer readable storage medium having program instructions embodied therewith, the program instructions executable by a processor to cause the processor to perform operations comprising:
receiving transducer data from rail inspection sensors mounted on a vehicle that is located on the rail; and
processing the transducer data to identify locations of suspected rail flaws in the rail, the processing comprising:
inputting the transducer data as a stream of overlapping sequences in a form suitable for a machine learning system, that has been trained to identify patterns in the transducer data that indicate rail flaws, the machine learning system comprising a deep learning convolutional neural network to perform image pattern recognition that is combined with a long short-term memory recurrent neural network to identify rail flaws of the rail of indeterminate length; and
receiving an output from the machine learning system, the output including a list of suspected rail flaws and their corresponding locations on the rail;
auditing at least one of the deep learning convolutional neural network or the long short-term memory recurrent neural network to identify at least one of a false positive or a false negative, the auditing comparing the output from the machine learning system to output from a human analyst;
adjusting the at least one of the deep learning convolutional neural network on the long short-term memory recurrent neural network based on the at least one of the false positive or the false negative; and
initiating a repair action based on the list of suspected rail flaws.

* * * * *

UNITED STATES PATENT AND TRADEMARK OFFICE
CERTIFICATE OF CORRECTION

| | | |
|---|---|---|
| PATENT NO. | : 11,078,631 B2 | Page 1 of 1 |
| APPLICATION NO. | : 15/826780 | |
| DATED | : August 3, 2021 | |
| INVENTOR(S) | : David Henry Gilbert | |

It is certified that error appears in the above-identified patent and that said Letters Patent is hereby corrected as shown below:

In the Claims

In Claim 1, Column 17, Line 61, delete "network on the" and replace it with --network or the--;

In Claim 10, Column 19, Line 2, delete "network on the" and replace it with --network or the--;

In Claim 19, Column 20, Line 8, delete "network on the" and replace it with --network or the--; and In Claim 20, Column 20, Line 46, delete "network on the" and replace it with --network or the--.

Signed and Sealed this
Fourteenth Day of March, 2023

Katherine Kelly Vidal
*Director of the United States Patent and Trademark Office*